UNITED STATES PATENT OFFICE.

JÜRGEN CALLSEN, OF ELBERFELD, GERMANY, ASSIGNOR TO FARBENFABRIKEN OF ELBERFELD CO., OF NEW YORK, N. Y., A CORPORATION OF NEW YORK.

ALKYLOXYMETHYL ESTER OF SALICYLIC ACID AND PROCESS OF MAKING SAME.

SPECIFICATION forming part of Letters Patent No. 706,018, dated August 5, 1902.

Application filed May 7, 1902. Serial No. 106,315. (No specimens.)

*To all whom it may concern:*

Be it known that I, JÜRGEN CALLSEN, doctor of philosophy, chemist, residing at Elberfeld, Germany, (assignor to the FARBENFABRIKEN OF ELBERFELD COMPANY, of New York,) have invented a new and useful Improvement in Pharmaceutical Compounds and Processes of Making Same, of which the following is a specification.

My invention relates to the production of new pharmaceutical products which are chemically alkyloxymethylic esters of salicylic acid having the following general formula:

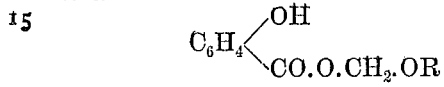

(R meaning an alkyl radical, such as methyl, ethyl, propyl, or the like,) and which according to my researches possess valuable therapeutic properties, being good remedies against rheumatism, an average dose being between three and ten grains for external application.

The process for producing my new compounds consists in treating salts of salicylic acid with halogenmethylalkylethers having the following general formula: $X-CH_2-OR$, (X meaning a halogen atom, R meaning an alkyl radical.) The new products thus produced are colorless liquids soluble in ether, alcohol, chloroform, and benzene. Their alcoholic solutions are colored violet by ferric chlorid.

In carrying out my new process practically I can proceed as follows, the parts being by weight: To a mixture of sixteen hundred parts of dry sodium salicylate and five thousand parts of benzene a solution of eight hundred and five parts of monochlorodimethylether having the formula $CH_2Cl-O-CH_3$ in eight hundred parts of benzene is added little by little, taking care that the temperature does not rise above 40° centigrade. After stirring for some time the reaction will be completed. The reaction mass is then treated with a dilute solution of sodium carbonate in order to remove the sodium chlorid and the excess of salicylic acid. Subsequently the benzene solution is dried by means of chlorid of calcium, the benzene is distilled off, and the residue is distilled *in vacuo.* The resulting methyloxymethylsalicylate having the formula:

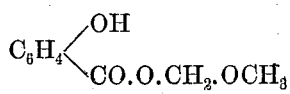

represents a clear odorless liquid, boiling at 153° centigrade under a pressure of about thirty-two millimeters. On being heated at the ordinary pressure formic aldehyde is split off. When treated with dilute acids, it breaks up into salicylic acid, formic aldehyde, and methylic alcohol.

The process proceeds in an analogous manner if other halogenmethylalkylethers be used. The ethyloxymethylsalicylic ester boils at 168° to 169° centigrade under a pressure of about forty-three millimeters.

Having now described my invention and in what manner the same is to be performed, what I claim as new, and desire to secure by Letters Patent, is—

1. The process for producing the new alkyloxymethylic esters of salicylic acid having the formula:

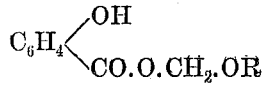

R meaning an alkyl radical, which process consists in first treating salts of salicylic acid with halogenmethylalkylethers having the above-defined formula: $X-CH_2-OR$ and secondly separating the resulting alkyloxymethylic esters of salicylic acid from the reaction mixture, substantially as hereinbefore described.

2. The process for producing the new methyloxymethylic ester of salicylic acid having the formula:

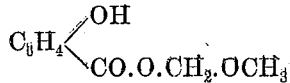

which process consists in first treating sodium salicylate with monochlorodimethyllether having the formula: $CH_2Cl-O-CH_3$ and secondly separating the resulting methyloxymethylic ester of salicylic acid, substantially as hereinbefore described.

3. The herein-described alkyloxymethylic esters of salicylic acid being colorless liquids soluble in ether, alcohol, chloroform and benzene, the alcoholic solutions being colored violet by ferric chlorid and exhibiting valuable therapeutic properties, substantially as hereinbefore described.

4. The herein-described methyloxymethylic ester of salicylic acid being a clear, odorless liquid boiling at 153° centigrade under a pressure of about thirty-two millimeters, breaking up into salicylic acid, formic aldehyde and methylic alcohol when reacted upon by dilute acids and exhibiting valuable therapeutic properties, substantially as hereinbefore described.

In testimony whereof I have signed my name in the presence of two subscribing witnesses.

JÜRGEN CALLSEN.

Witnesses:
OTTO KÖNIG,
T. A. RITTERSHAUS.